(12) United States Patent
Ellingson

(10) Patent No.: US 7,769,208 B2
(45) Date of Patent: Aug. 3, 2010

(54) CAPTURING AND ENCODING UNIQUE USER ATTRIBUTES IN MEDIA SIGNALS

(75) Inventor: Eric E. Ellingson, McMinnville, OR (US)

(73) Assignee: Digimarc Corporation, Beaverton, OR (US)

( * ) Notice: Subject to any disclaimer, the term of this patent is extended or adjusted under 35 U.S.C. 154(b) by 1122 days.

(21) Appl. No.: 11/382,207

(22) Filed: May 8, 2006

(65) Prior Publication Data

US 2006/0195910 A1    Aug. 31, 2006

Related U.S. Application Data

(63) Continuation of application No. 09/585,678, filed on Jun. 1, 2000, now Pat. No. 7,043,048.

(51) Int. Cl.
*G06K 9/00* (2006.01)

(52) U.S. Cl. .................. 382/115; 382/100; 382/124

(58) Field of Classification Search ............ 382/100, 382/115, 124
See application file for complete search history.

(56) References Cited

U.S. PATENT DOCUMENTS

| | | | |
|---|---|---|---|
| 55,422 A | 6/1866 | Roustaei | |
| 4,015,240 A | 3/1977 | Swonger et al. | |
| 4,109,237 A | 8/1978 | Hill | |
| 4,528,588 A | 7/1985 | Lofberg | |
| 4,620,318 A | 10/1986 | Hill | |
| 4,994,831 A | 2/1991 | Marandi | |
| 4,995,086 A | 2/1991 | Lilley et al. | |
| 5,103,486 A | 4/1992 | Grippi | |
| 5,284,364 A | 2/1994 | Jain | |
| 5,499,294 A | 3/1996 | Friedman | |
| 5,646,997 A | 7/1997 | Barton | |
| 5,767,496 A | 6/1998 | Swartz et al. | |
| 5,787,186 A | 7/1998 | Schroeder | |
| 5,799,092 A | 8/1998 | Kristol et al. | |
| 5,841,886 A | 11/1998 | Rhoads | |
| 5,857,038 A | 1/1999 | Owada et al. | |
| 5,907,149 A | 5/1999 | Marckini | |
| 5,917,542 A * | 6/1999 | Moghadam et al. | 348/231.99 |
| 5,995,630 A * | 11/1999 | Borza | 380/54 |

(Continued)

FOREIGN PATENT DOCUMENTS

WO    WO96/03286    2/1996

(Continued)

OTHER PUBLICATIONS

"Copyright Protection for Digital Images, Digital Fingerprinting from FBI," Highwater FBI brochure, 1995, 4 pages.

(Continued)

*Primary Examiner*—Wes Tucker

(57) ABSTRACT

User attribute data, such as a retinal scan or fingerprint data, is encoded into a media signal as it is captured in media capture device, such as a camera, video recorder, etc. The user attribute data uniquely associates the creator with the content he or she creates. By steganographically embedding the user attribute data into the content at or near the time of capture, the creator of the content can be authenticated at a subsequent time. In addition, alteration of the content can be detected.

3 Claims, 3 Drawing Sheets

U.S. PATENT DOCUMENTS

| | | |
|---|---|---|
| 6,005,936 A | 12/1999 | Shimizu et al. |
| 6,064,737 A | 5/2000 | Rhoads |
| 6,064,764 A | 5/2000 | Bhaskaran et al. |
| 6,148,091 A | 11/2000 | DiMaria |
| 6,185,316 B1 | 2/2001 | Buffam |
| 6,185,318 B1 | 2/2001 | Jain et al. |
| 6,208,746 B1 | 3/2001 | Musgrave |
| 6,243,481 B1 | 6/2001 | Tao |
| 6,263,091 B1 | 7/2001 | Jain et al. |
| 6,289,112 B1 | 9/2001 | Jain et al. |
| 6,292,092 B1 | 9/2001 | Chow et al. |
| 6,301,368 B1 | 10/2001 | Bolle et al. |
| 6,314,197 B1 | 11/2001 | Jain et al. |
| 6,321,981 B1 | 11/2001 | Ray et al. |
| 6,332,193 B1 | 12/2001 | Glass et al. |
| 6,366,680 B1 | 4/2002 | Brunk et al. |
| 6,377,699 B1 | 4/2002 | Musgrave et al. |
| 6,389,151 B1 | 5/2002 | Carr et al. |
| 6,397,334 B1 | 5/2002 | Chainer et al. |
| 6,577,336 B2 | 6/2003 | Safai |
| 6,687,383 B1 | 2/2004 | Kanevsky et al. |
| 6,931,451 B1 | 8/2005 | Logan et al. |
| 7,224,995 B2 | 5/2007 | Rhoads |
| 7,289,643 B2 | 10/2007 | Brunk |
| 2001/0007130 A1 | 7/2001 | Takaragi |
| 2001/0011680 A1 | 8/2001 | Soltesz et al. |
| 2001/0025342 A1 | 9/2001 | Uchida |
| 2001/0034835 A1 | 10/2001 | Smith |
| 2002/0010684 A1 | 1/2002 | Moskowitz |
| 2002/0061120 A1 | 5/2002 | Carr et al. |
| 2002/0072935 A1 | 6/2002 | Rowse et al. |
| 2002/0080396 A1 | 6/2002 | Silverbrook et al. |
| 2003/0011684 A1 | 1/2003 | Narayanaswami et al. |
| 2005/0036656 A1 | 2/2005 | Takahashi |

FOREIGN PATENT DOCUMENTS

| | | |
|---|---|---|
| WO | WO98/27510 | 6/1998 |
| WO | WO00/36605 | 6/2000 |
| WO | WO0070585 | 11/2000 |

OTHER PUBLICATIONS

Friedman, "The Trustworthy Digital Camera: Restoring Credibility to the Photographic Image," IEEE Transactions on Consumer Electronics, vol. 39, No. 4, Nov. 1993, pp. 905-910.

Bender et al., "Applications for Data Hiding," IBM Systems Journal, vol. 39, Nos. 3&4, 2000, pp. 547-568.

* cited by examiner

CAPTURING AND ENCODING UNIQUE USER ATTRIBUTES IN MEDIA SIGNALS

RELATED APPLICATION DATA

This application is a continuation of application Ser. No. 09/585,678, filed Jun. 1, 2000 (now U.S. Pat. No. 7,043,048).

The subject matter of the present application is related to that disclosed in U.S. Pat. No. 5,862,260, and in application Ser. No. 09/503,881, filed Feb. 14, 2000 (now U.S. Pat. No. 6,614,914).

The foregoing documents are incorporated by reference.

TECHNICAL FIELD

The invention relates to multimedia signal processing, and in particular, relates to encoding information into media signals.

BACKGROUND AND SUMMARY

Advances in electronics have made it trivial to capture and edit creative digital works, including images, audio, and video. These advances also make it difficult to control unauthorized copying and alteration of these works. In particular, one challenge presented by this technology is to uniquely associate a work with its creator. Another challenge is to prevent tampering of the work, or at least provide a reliable method for detecting tampering.

One way to associate multimedia data with its owner or creator is to hide identifying information in the media signal through data hiding or steganography. Steganography refers to a process of hiding information into a signal. One example of steganography is digital watermarking. Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other transform domain (e.g., Fourier, Discrete Cosine, Wavelet Transform domains). The reading component analyzes target content to detect whether a watermark is present. In applications where the watermark encodes information (e.g., a message), the reader extracts this information from the detected watermark.

The present assignee's work in steganography, data hiding and watermarking is reflected in U.S. Pat. No. 5,862,260; in application Ser. Nos. 09/503,881 and 09/452,023 (now U.S. Pat. Nos. 6,614,914 and 6,408,082); and in published specifications WO 9953428 and WO0007356 (corresponding to U.S. application Ser. Nos. 09/074,034 (now U.S. Pat. No. 6,449,377) and 09/127,502 (now U.S. Pat. No. 6,345,104)). A great many other approaches are familiar to those skilled in the art. The artisan is presumed to be familiar with the full range of literature about steganography, data hiding and watermarking.

The invention provides methods, systems and devices for capturing and encoding a user attribute in a media signal. It also provides methods, systems and devices for authenticating the media signal using the encoded user attribute data.

One aspect of the invention is a method for capturing and encoding a user attribute in a media signal. This method applies to a variety of media signals, including images (still and video) and audio. The method captures a user attribute of the user of a media signal capture device, such as a camera, video recorder, etc. It then encodes the user attribute into a media signal captured by the device. The method may be implemented in the media signal capture device, which enables the user attribute data to be captured from the user and encoded into content as it is being captured by the device.

One type of user attribute data is a retinal scan. This type of data is particularly suited for digital camera applications. In such applications, an image sensor may capture the photographer's retinal image for immediate encoding into an image captured with the same or a different image sensor in the camera. The method applies to other media capture devices, media signal types, and user attributes such as a voice signature, fingerprint, etc.

Another aspect of the invention is a media signal capture device capable of encoding a user attribute in a media signal captured in the device. The device includes a user attribute capture unit for capturing a user attribute of a user of the media signal capture device. It also includes an encoder for encoding the user attribute into a media signal captured by the device.

Another aspect of the invention is a method of authenticating a media signal. The method decodes user attribute data encoded in the media signal within a media signal capture device that captured the media signal. It then compares the decoded user attribute data with user attribute data computed for a person. This process may be used to verify that a creator of the content, such as photographer, did create the media content in question (e.g., a photograph, video recording, etc.).

Further features will become apparent with reference to the following detailed description and accompanying drawings.

DETAILED DESCRIPTION

Figure 1:
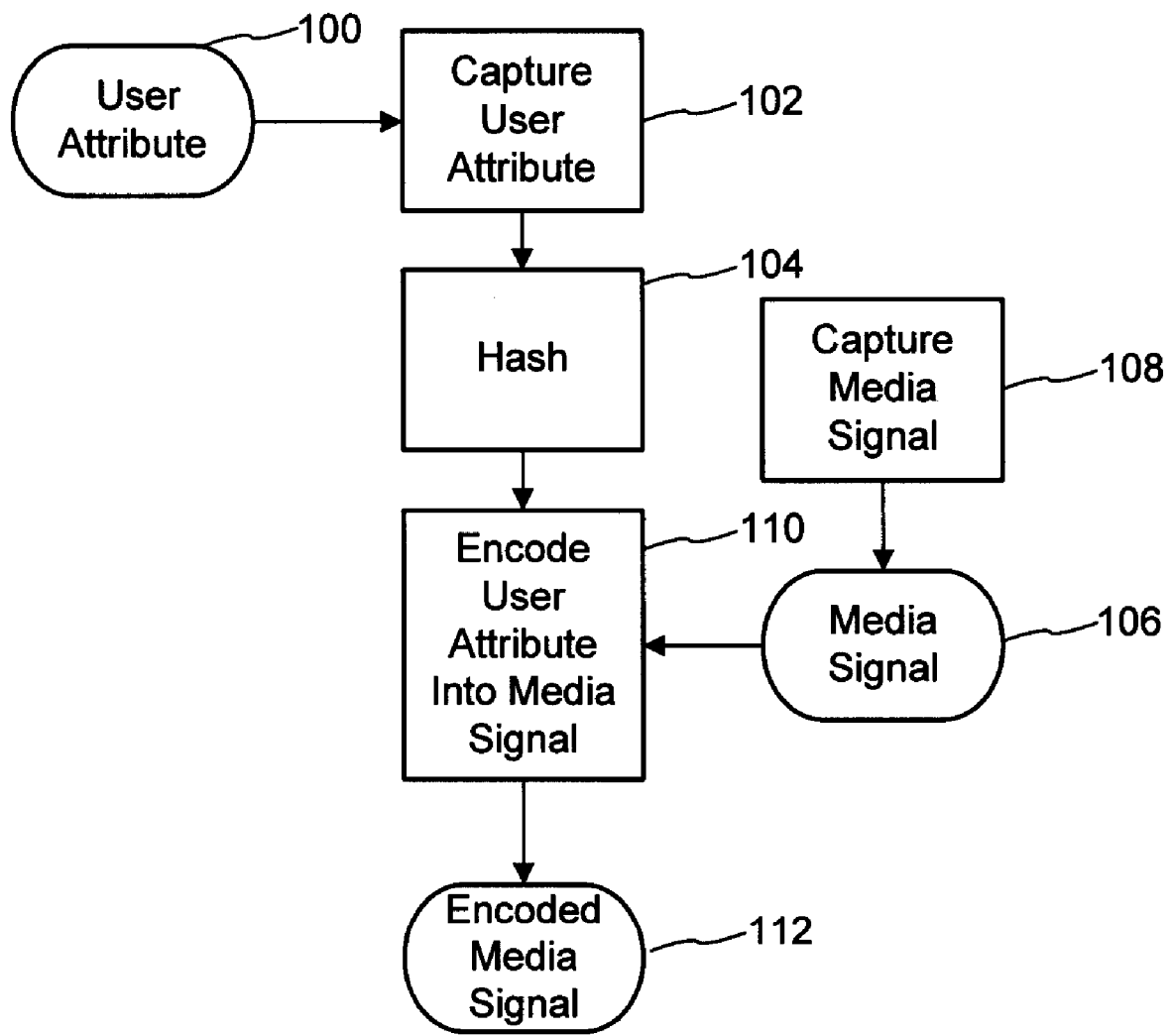
FIG. 1 is a diagram illustrating a method for encoding an attribute of a user of a media capture device into a media signal captured by the device.

FIG. 1 is a diagram illustrating a method for encoding a user attribute of a user of a media capture device into a media signal captured by the device. This method integrates a process of capturing the media signal (e.g., image or audio signal) with a process of encoding a user attribute into the media signal. By combining these processes, it provides a convenient and reliable way of encoding information about the content creator into the content. Additionally, since it can be performed at the time of capture of the content, it enables subsequent alteration of the content to be detected. These features make the method particularly useful in associating the content with its creator and authenticating the content.

As depicted in FIG. 1, the method captures a user attribute (100) of the user of the device (102). Preferably, the user attribute should uniquely identify the user, should enable immediate and automated capture by the device, and should allow capture at or near the time of capture of the media signal in which it is embedded. However, these criteria are not absolute necessities for all applications. One example of a user attribute is an image of an identifying characteristic of the user such as a retinal scan or fingerprint. Another is a voice recording. The capture of this data is implemented in a user attribute capture unit, which may include an image sensor and optical elements, a digital recorder and user input controls, a fingerprint scanning element, etc.

After capturing the user attribute, the method may optionally convert it into a more compact data representation. In a typical application, the user attribute is in the form of an electronic signal, such as a digital image of a retinal scan or fingerprint or a digital audio recording of the user's voice. In these cases, the method transforms the signal representing the user attribute into more compact, yet statistically unique user attribute data. Statistically unique, in this context, refers to an attribute that is statistically improbable of being generated from two different users. The process of generating the user attribute data is generally depicted as a hash in FIG. 1 (104). A "hash" in this context refers to transformation in a data representation from one form to another where the data retains statistically unique characteristics.

For additional security, cryptographic functions may be used to digitally sign and encrypt the user attribute data. Encryption provides an additional layer of security to prevent unwanted uses of the encoded information. Some examples of applicable cryptographic methods include RSA, DES, IDEA (International Data Encryption Algorithm), skipjack, discrete log systems (e.g., El Gamal Cipher), elliptic curve systems, cellular automata, etc.

These cryptographic methods may be used to create a digital signature to place in a watermark message. Public key cryptographic methods employ a private and public key. The private key is kept secret, and the public key is distributed. To digitally sign a user attribute data, the media capture device encrypts the message with a private key. The private key is uniquely associated with the device or a particular user. Those having a public key verify that the message has originated from the holder of the private key by using the public key to decrypt the message.

The user attribute data may be both encrypted and digitally signed using two stages of encryption. In the encoding process, a digital signature stage encrypts at least part of the data with a private key. An encryption stage then encrypts the signed data with a public key. The decoding process reverses these steps. First, a decryption stage decrypts the data with a private key corresponding to public key used in the encryption stage. Then, a second stage decrypts the output of the previous stage with the public key corresponding to the private key used to authenticate the data.

As a separate, and potentially concurrent process to the process of capturing the user attribute data, the method captures a media signal (106) into which the user attribute data will be embedded (108). Some examples include capturing an image, or a sequence of video frames in a camera, recording an audio signal, or both image and audio capture (such as in a video camera).

Next, the method encodes the user attribute data into the media signal to create an encoded media signal (110, 112). One way to encode the data is to steganographically embed it in the media signal. Examples of steganographic embedding implementations are provided in U.S. Pat. No. 5,862,260, and U.S. patent application Ser. No. 09/503,881, referenced above. Another way to encode the user attribute data is to place it in a file header of the media signal.

The method outlined above enables user attributes to be encoded into a media signal at or near the time of capture. For example, the method may be implemented within media capture devices such as cameras, scanners, recorders, etc. This feature links the user of the capture device and creator of the media content to the content. In cases where steganographic techniques, such as digital watermarking, are used to encode the user attribute data, the association between the user attributes and the content remains through various transformations and file format changes, is imperceptible or substantially imperceptible to humans viewing or listening to the content, and can be used to establish whether or not the content has been tampered with after capture.

Figure 2:
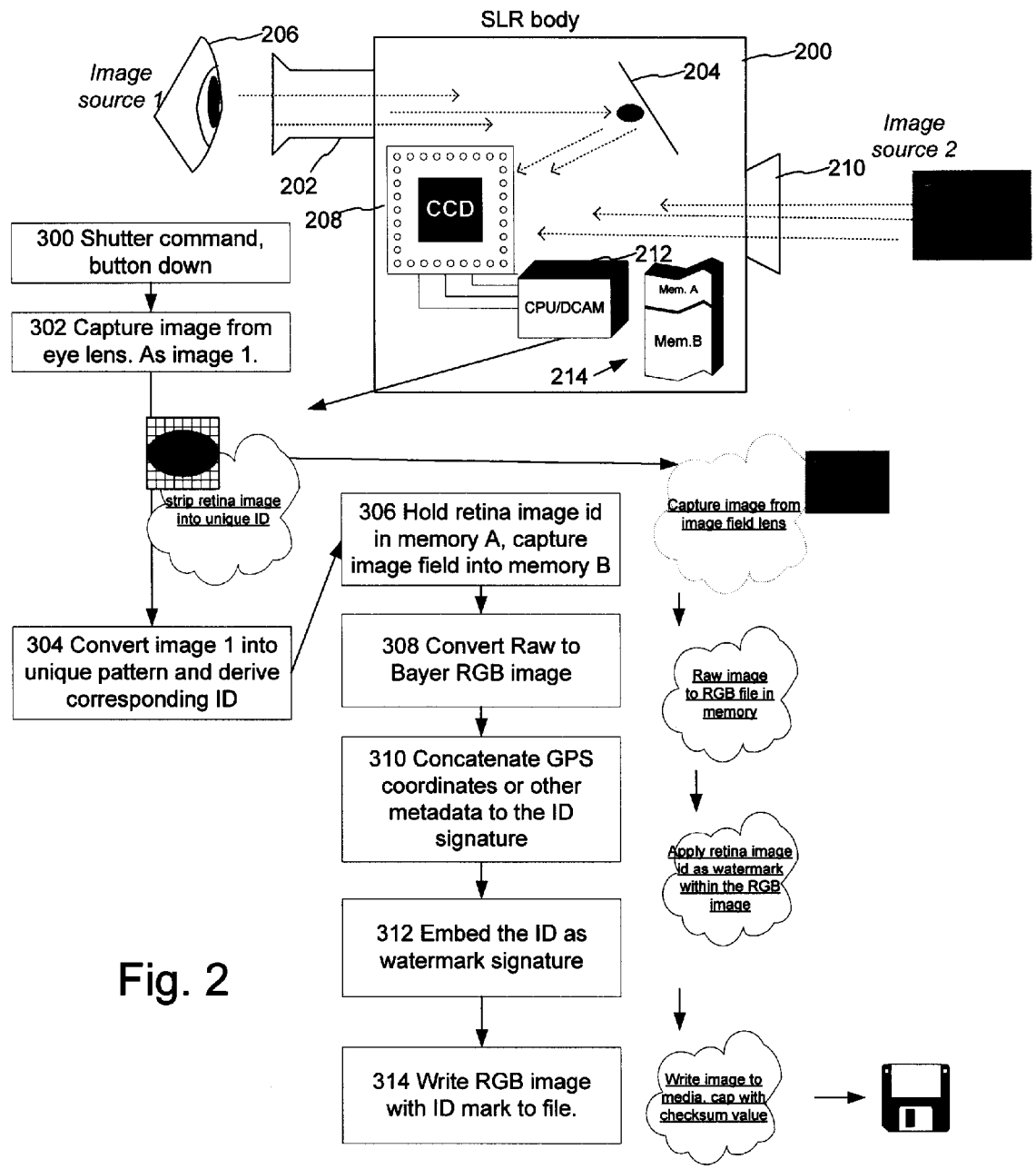
FIG. 2 is a diagram illustrating a method for encoding retinal scan data into an image.

To provide an example, FIG. 2 depicts a system and method for encoding retinal scan data into an image. In this example, the method is implemented within a single lens reflex digital camera. This type of configuration is common in commercially available 35 mm digital cameras. The single lens reflex body 200 includes an eyepiece 202 through which the photographer view's the subject of the photograph. An optical element 204 directs light reflected from the photographer's eye 206 (Image source 1) to an image sensor 208. The image sensor depicted here is a CCD array. Alternative sensor technology, such as a CMOS sensor may also be used.

FIG. 2 shows a configuration where the sensor used to record a user attribute also captures an image into which the user attribute is encoded. The light from the subject (Image source 2) enters the camera through its primary optical element 210 (e.g., an image field lens) and is directed to the image sensor 208. In response to the user actuating a shutter command (or other analogous signal capture command), the camera time multiplexes the image sensor to capture user attribute data and the subject image. As an alternative, the camera may include a separate image sensors for user attribute and subject image data, respectively. Using separate sensors, the camera can capture the user attribute data at the same time as the subject image data.

A controller 212, such as the Central Processing Unit/Digital Camera (CPU/DCAM) integrated circuit shown in FIG. 2, controls image capture from the two image sources in response to a user's image capture input command. The controller communicates with a memory subsystem 214, which includes one or more memory devices for storing program code, image data, and image metadata, including user attribute data.

One operation scenario proceeds as depicted in FIG. 2 and described below. First, the photographer presses a shutter command button on the camera (300). In response, the sensor captures an image of the photographer's eye through the eyepiece (302). The controller transfers the image to memory, analyzes it to derive a statistically unique retina image, and hashes the retina image into an identifier to be encoded into an image (304). While a variety of hashing algorithms can be used, the hash algorithm used to compute the identifier should retain the statistically unique characteristic of the retina image. Examples of hashing algorithms include MD5, MD2, SHA, SHA1.

While it holds this identifier in memory A, the controller captures an image of the subject through the primary optical element 210 and places it into memory B (306). Next, the controller performs conventional color formatting of the captured image, such as raw image to Bayer RGB image formatting (308).

The controller may also gather additional metadata relating to the image. There are many types of metadata such as: a time stamp, camera settings, a user name, location, etc. The controller may encode a cross reference link to this metadata into the image or its file header/footer. The cross reference link may be a number or other code (HTML link, pointer, address, index, etc.) that references a device where the metadata is stored. For example, the metadata may be stored in an external database and referenced via the link. The metadata may be transferred from the camera along with the image data via a wire or wireless link to the database.

Alternatively, the controller may encode the metadata directly into the image or the file header/footer (see, for example, block 310, FIG. 2). For example, metadata such as a time stamp, location (e.g., GPS coordinates), etc. may be concatenated with the identifier representing user attribute data and encoded into the image. The metadata is generated by the camera, devices in the camera (a GPS device, clock) or from user input. The embedded metadata may also include a hash of the image that is later used to detect image alteration. To be effective, a hash function used to compute an image hash that is embedded in the image should be insensitive to the alteration of the image caused by embedding auxiliary data into the image. For more on associating metadata with media signals such as images, audio and video, see co-pending application Ser. No. 09/507,096, entitled Associating Data with Images In Imaging Systems, filed on Feb. 17, 2000.

Returning to the example depicted in FIG. 2, the controller embeds the identifier into the formatted image using a watermark encoding process (312). Examples of watermark encoding processes are provided in U.S. Pat. No. 5,862,260, and in application Ser. No. 09/503,881, filed Feb. 14, 2000, referenced above. Other image watermark, steganographic or data hiding programs may be used to encode the identifier in the subject image as well.

Finally, the controller writes the image marked with the identifier to a file (314). The user or controller may transfer the image from the camera to another device via a portable memory device (such as flash memory, floppy disk, etc.) or a wire or wireless communication link (e.g., infrared, radio, wireless modem, modem, USB, USB2, IEEE 1394, computer network connection, etc.). As an additional step, the controller may also hash the marked image and insert the image hash in the file header/footer before transferring it. One simple hash is a check sum. Other cryptographic hashes may be used, such as those cited earlier.

Figure 3:
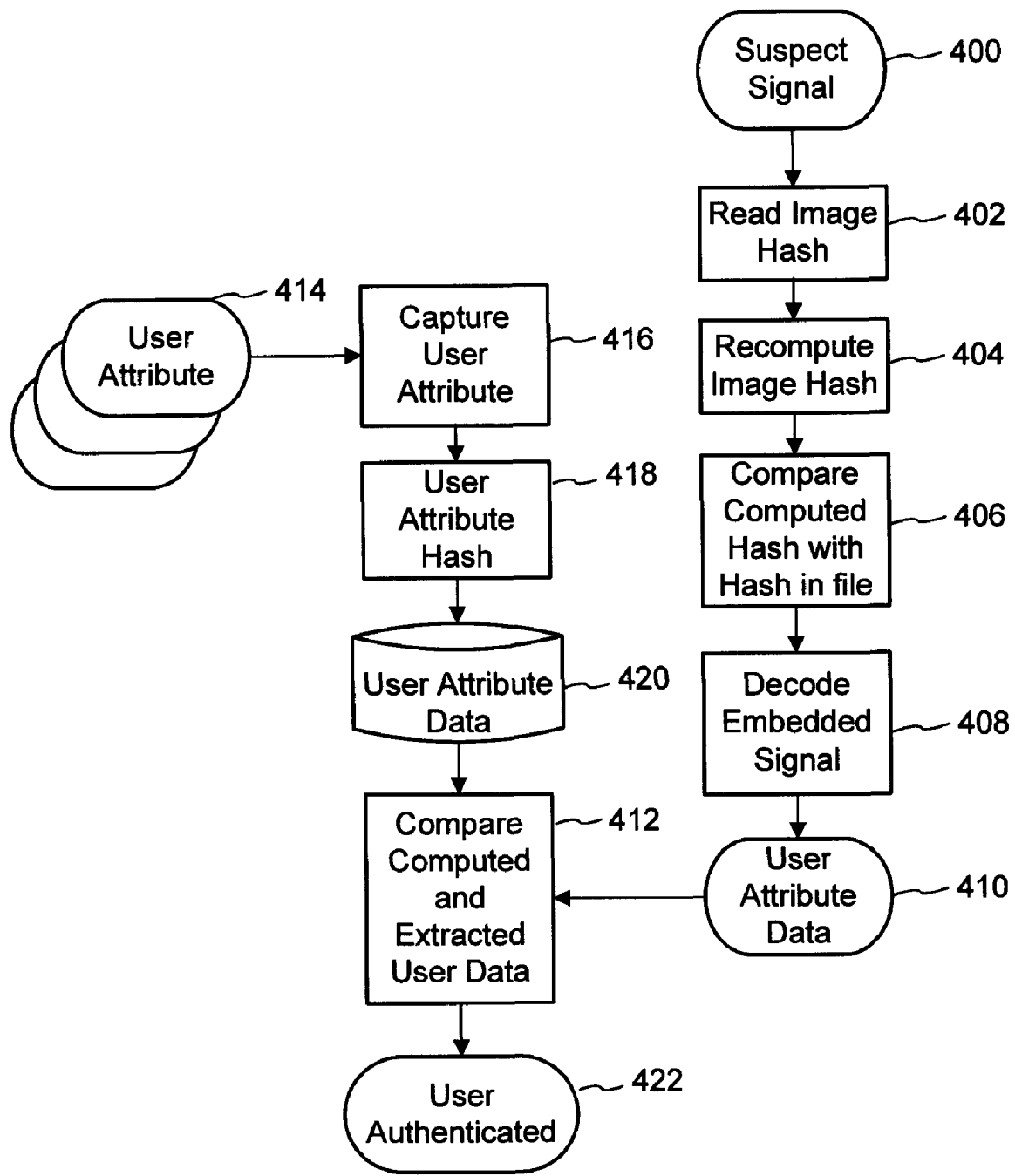
FIG. 3 illustrates a method for evaluating an image processed as shown in FIG. 2.

FIG. 3 illustrates a method for evaluating an image processed as shown in FIG. 2. In cases where the image file includes an image hash, the process begins by evaluating the hash to determine whether the image has been altered. The input is a suspect image 400, which may have undergone some tampering or alteration after being captured. The method reads the image hash from the file (402) (e.g., from the header or footer), re-computes the image hash for the suspect image (404), and compares this computed hash with the one read from the file (406). If the two hashes differ, then the image has been altered.

Next, the method proceeds to check the user attribute data. It decodes the embedded user attribute data (408, 410) from the image using a decoder compatible with the encoder. It then compares the extracted user data with separately computed user data to determine whether there is a match (412).

There are several application scenarios for this user authentication process. In one scenario, the user attribute data for a person purported to be the photographer is captured (414, 416), hashed (418, 420) and compared with the extracted user data (412). If there is a match, then the photographer is deemed to have created the suspect image (422). In another scenario, user attributes (416) for several photographers are captured (416), hashed (418), and stored in a database (420), along with information about the person. The user attribute data extracted from the image is used as an index to this database to look up the identity of the photographer.

The processes depicted in FIG. 3 may be implemented in hardware, software or a combination of hardware and software. For example, the process may be incorporated into an authentication system implemented in a computer or computer network. The processes depicted in FIG. 3 may be implemented in programs executed from the system's memory (a computer readable medium, such as an electronic, optical or magnetic storage device.) Suspect media signals may be delivered to the computer electronically via a wire or wireless network or memory device (e.g., flash memory, optical disk, magnetic storage device, etc.), or by scanning or recording an analog form of the suspect media signal (scanning a photograph, or recording suspect analog audio signals). In the case where analog versions of the suspect signal are evaluated, steganographic embedding processes used to encode the user attribute data should be selected to survive digital to analog and analog to digital conversion.

While the specific examples provided in FIGS. 2 and 3 related to digital cameras, similar processes may be implemented in other media signal capture devices, including scanners, and audio and video recorders. Retinal scan data is one example of a user attribute data. Other types of user attribute data include a fingerprint or voice signature. A fingerprint may be captured by requesting the user of the capture device to place a finger on a scanning element, and then taking an image of the finger. A voice signature may be captured by recording the user's voice, and then coding a digital recording of the voice into signature for embedding in the media signal. One way to encode the digital recording is to use audio compression, and particularly, coding designed for voice signals.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. These patents and patent applications provide additional details about implementing watermarking systems.

The particular combinations of elements and features in the above-detailed embodiments are exemplary only; the interchanging and substitution of these teachings with other teachings in this and the incorporated-by-reference patents/applications are also contemplated.

I claim:

1. A device comprising:
   a first processing system that senses biometric information from a user, to produce first data related thereto;
   an audio sensing system that produces second data corresponding to sensed audio;
   a processor that associates said first and second data; and
   a wireless system that transmits said data from the device;
   Wherein said processor steganographically encodes said first data into said second data.

2. The device of claim 1 wherein said biometric information comprises a user fingerprint.

3. In a handheld device that includes a first capture system adapted to capture audible information, and produce audio data corresponding thereto, an improvement comprising:

a second capture system adapted to capture biometric information associated with an operator of said device, and produce biometric data corresponding thereto, said second capture system including one or more elements in addition to said first capture system; and a processor adapted to alter the audio data to encode the biometric data therein.

* * * * *